(12) United States Patent
Dadiomov et al.

(10) Patent No.: US 6,529,932 B1
(45) Date of Patent: Mar. 4, 2003

(54) METHOD AND SYSTEM FOR DISTRIBUTED TRANSACTION PROCESSING WITH ASYNCHRONOUS MESSAGE DELIVERY

(75) Inventors: Alexander Dadiomov, Redmond, WA (US); Raphael Renous, Haifa (IL); Uri Habusha, Mitzpe Hoshaya (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/052,972

(22) Filed: Apr. 1, 1998

(51) Int. Cl.[7] .................................................. G06F 9/00
(52) U.S. Cl. ....................... 709/101; 709/314; 709/313; 709/201
(58) Field of Search ................................ 709/101, 313, 709/312, 310, 314, 201, 200

(56) References Cited

U.S. PATENT DOCUMENTS

| | | |
|---|---|---|
| 4,499,576 A | 2/1985 | Fraser |
| 4,584,679 A | 4/1986 | Livingston et al. |
| 4,623,886 A | 11/1986 | Livingston |
| 4,656,474 A | 4/1987 | Mollier et al. |
| 4,736,369 A | 4/1988 | Barzilai et al. |
| 4,769,815 A | 9/1988 | Hinch et al. |
| 4,853,842 A | 8/1989 | Thatte et al. |
| 5,063,562 A | 11/1991 | Barzilai et al. |
| 5,072,370 A | 12/1991 | Durdik |
| 5,163,131 A | 11/1992 | Row et al. |
| 5,193,090 A | 3/1993 | Filipiak et al. |
| 5,247,676 A | 9/1993 | Ozur et al. |
| 5,261,002 A | 11/1993 | Perlman et al. |
| 5,285,445 A | 2/1994 | Lehnert et al. |
| 5,287,103 A | 2/1994 | Kasprzyk et al. |
| 5,367,523 A | 11/1994 | Chang et al. |

(List continued on next page.)

OTHER PUBLICATIONS

IBM. "Data communication and inter–product communication" 1995, p. 1–4.*
IBM. "MQSeries System Administration". Chapters 11 and 12, p. 141–193. Sep. 1997.*
IBM. "MQSeries Application Programming Guide" Chapter 13, p. 185–196. Feb. 1998.*
Haerder, Theo. et al. "Concepts for Transaction Recovery in Nested Transactions". ACM, p. 239–248. 1987.*
Karoui, Ramzi et al. "Asynchronous Nested Transactions for Multi–tier Applications". p. 1–9. 1999.*
Marazakis, M et al. "Tpsim—A Simulator for Transaction Processing Systems". Oct. 1995.*

(List continued on next page.)

*Primary Examiner*—St. John Courtenay, III
*Assistant Examiner*—Lewis A. Bullock, Jr.
(74) *Attorney, Agent, or Firm*—Leydig, Voit & Mayer, Ltd.

(57) ABSTRACT

A method and system for coordinating distributed transactions provides atomic processing of distributed transactions on computers in a network with asynchronous message delivery. In a distributed transaction, an application on a first computer initiates a first operation and sends a request message for a second operation to a second application on a remote computer. The first operation and the sending of the request message are performed in a local committed transaction on the first computer. The request message is delivered exactly once and in order to the remote computer and is read by the second application. The performance of the second operation and the sending of an acknowledgment to the first application are performed in a local committed transaction by the second computer. The sending computer and the receiving computer of the request message may be on two different message queuing systems bridged by a connector computer which translates a message from one message queuing system and forwards the message to the destination queue in the other message queuing system.

16 Claims, 5 Drawing Sheets

U.S. PATENT DOCUMENTS

| | | | |
|---|---|---|---|
| 5,412,717 A | 5/1995 | Fischer | |
| 5,432,715 A | 7/1995 | Shigematsu et al. | |
| 5,442,637 A | 8/1995 | Nguyen | |
| 5,465,328 A | 11/1995 | Dievendorff et al. | |
| 5,491,791 A | 2/1996 | Glowny et al. | |
| 5,499,297 A | 3/1996 | Boebert | |
| 5,526,358 A | 6/1996 | Gregerson et al. | |
| 5,526,489 A | 6/1996 | Nilakantan et al. | |
| 5,528,605 A | 6/1996 | Ywoskus et al. | |
| 5,546,391 A | 8/1996 | Hochschild et al. | |
| 5,555,415 A | 9/1996 | Allen | |
| 5,557,748 A | 9/1996 | Norris | |
| 5,572,522 A | 11/1996 | Calamvokis et al. | |
| 5,572,582 A | 11/1996 | Riddle | |
| 5,613,012 A * | 3/1997 | Hoffman et al. | 235/380 |
| 5,627,766 A | 5/1997 | Beaven | |
| 5,689,706 A | 11/1997 | Rao et al. | |
| 5,758,184 A | 5/1998 | Lucovsky et al. | |
| 5,761,507 A | 6/1998 | Govett | |
| 5,764,625 A | 6/1998 | Bournas | |
| 5,768,614 A | 6/1998 | Takagi et al. | |
| 5,777,987 A | 7/1998 | Adams et al. | |
| 5,778,384 A | 7/1998 | Provino et al. | |
| 5,781,703 A | 7/1998 | Desai et al. | |
| 5,793,861 A | 8/1998 | Haigh | |
| 5,799,321 A | 8/1998 | Benson | |
| 5,806,065 A | 9/1998 | Lomet | |
| 5,812,773 A | 9/1998 | Norin | |
| 5,812,819 A | 9/1998 | Rodwin et al. | |
| 5,815,667 A | 9/1998 | Chien et al. | |
| 5,819,042 A | 10/1998 | Hansen | |
| 5,819,272 A | 10/1998 | Benson | |
| 5,828,653 A | 10/1998 | Goss | |
| 5,832,514 A | 11/1998 | Norin et al. | |
| 5,835,727 A | 11/1998 | Wong et al. | |
| 5,838,907 A | 11/1998 | Hansen | |
| 5,845,081 A | 12/1998 | Rangarajan et al. | |
| 5,854,901 A | 12/1998 | Cole et al. | |
| 5,864,669 A | 1/1999 | Osterman et al. | |
| 5,870,540 A | 2/1999 | Wang et al. | |
| 5,872,968 A | 2/1999 | Knox et al. | |
| 5,872,971 A * | 2/1999 | Knapman et al. | 709/101 |
| 5,875,301 A | 2/1999 | Duckwall et al. | |
| 5,875,306 A | 2/1999 | Bereiter | |
| 5,878,056 A | 3/1999 | Black et al. | |
| 5,881,051 A | 3/1999 | Arrowood et al. | |
| 5,887,275 A | 3/1999 | Nguyen et al. | |
| 5,901,138 A | 5/1999 | Bader et al. | |
| 5,916,307 A * | 6/1999 | Piskiel et al. | 709/314 |
| 5,920,697 A | 7/1999 | Masters et al. | |
| 5,922,049 A | 7/1999 | Radia et al. | |
| 5,930,479 A | 7/1999 | Hall | |
| 5,956,340 A | 9/1999 | Afek et al. | |
| 5,959,995 A | 9/1999 | Wicki et al. | |
| 5,987,496 A | 11/1999 | Shen et al. | |
| 6,012,059 A | 1/2000 | Neimat et al. | |
| 6,012,094 A * | 1/2000 | Leymann et al. | 707/202 |
| 6,058,389 A * | 5/2000 | Chandra et al. | 707/1 |
| 6,088,816 A | 7/2000 | Nouri et al. | |
| 6,154,128 A | 11/2000 | Wookey et al. | |
| 6,157,927 A * | 12/2000 | Schaefer et al. | 707/10 |
| 6,167,358 A | 12/2000 | Othmer et al. | |
| 6,173,422 B1 | 1/2001 | Kimura et al. | |
| 6,182,086 B1 * | 1/2001 | Lomet et al. | 707/202 |
| 6,397,352 B1 * | 5/2002 | Chandrasekaran et al. | 709/201 |
| 6,401,136 B1 * | 6/2002 | Britton et al. | 709/314 |

OTHER PUBLICATIONS

*Microsoft Message Queuing Services: A Guide to Reviewing Microsoft Message Queuing Service Release 1.0*, Microsoft Corporation, Redmond, Washington, 1997.

Comer, Douglas E., *Internetworking With TCP/IP vol. 1: Principles, Protocols, and Architecture*, Chapter 6: Determining an Internet Address at Startup (RARP) and Chapter 18: Client–Server Model of Interaction, pp. 83–88, 293–309, Prentice–Hall, Englewood Cliffs, New Jersey, 1991.

Benaloh, Josh et al, *The Private Communication Technology (PCT) Protocol*, Internet Draft, available from http://premium.microsoft.com/msdn/library/bkgrnd/html/pct/hml, Oct., 1995.

Marshall, Martin, "Microsoft Updates Falcon Beta", *Internetweek*, Issue 653, Mar. 10, 1997.

Bowen, Ted Smalley, "Asynchronous Messaging Pushes to the Fore", *Infoworld*, Feb. 23, 1998. Available from http://www.infoworld.com/cgi–bin/displayTC.pl?/980223sbl–async.htm.

Biggs, Maggie, "Applications Released from Platform Confines: Message Queuing Exchanges Data Between Apps Regardless of Platform", *Infoworld*, Feb. 23, 1998. Available from http://infoworld.com/cgi–bin/displayTC.pl?/980223analysis.htm.

*Using MSMQ as an RPC Transport*, Microsoft Corporation, 1997.

Tarjan, Robert Endre, *Data Structures and Network Algorithms*, Chapter 3: Heaps, pp. 33–43, Society for Industrial and Applied Mathematics, Philadelphia, Pennsylvania, 1993.

*Microsoft Message Queue Server 1.0 Release Notes*, Microsoft Corporation, Redmond Washington, 1997.

*Microsoft Message Queue Server: A Guide to Reviewing and Evaluation Microsoft Message Queue Server Beta 2 Release*, Microsoft Corporation, Redmond, Washington, 1997.

Richter, Jeffrey, *Advanced Windows: The Professional Developers Guide to the Win32 API for Windows NT 4.0 and Windows 95*, Chapter 11: Window Messages and Asynchronous Input, pp. 461–528, Microsoft Press, Redmond, Washington, 1997.

Sinha, Alok K., *Network Programming in Windows NT*, Chapter 5: Windows Sockets in Windows NT, pp. 199–299, Addison–Wesley Publishing Company, Reading, Massachusetts, 1996.

Gilman, Len and Schreiber, Richard, *Distributed Computing with IBM MQSeries*, John Wiley & Sons, New York, New York, 1997.

Blakeley, Burnie: Harris, Harry, and Lewis, Rhys, *Messaging & Queuing Using the MQI*, McGraw–Hill Inc., New York, New York, 1995.

Lam, Richard B., "Shared Memory and Message Queues", *Dr. Dobb's Journal on CD–Rom*, Mar. 1995 p. 2–3.

Newton, Harry, *Newton's Telecomm Dictionary, 8hu th Ed*, Flatiron Publishing, 1994, pp. 333 and 870.

Blakeley et al., *Messaging and Queuing Using the MQI*, McGraw Hill, Inc.; New York, NY, 1995.

Douglas E. Comer, *Interneting with TCP/IP, vol. 1: Principles, Protocols and Architecture, Second Edition*, Chapter 19, 1991.

Andrew S. Tanenbaum, *Computer Networks, Third Edition*, Prentice Hall, New Jersey; pp. 577–622, 1996.

U.S. patent application Ser. No. 09/108,039, filed Jun. 30, 1998, pending.

U.S. patent application Ser. No. 09/054,169, filed Apr. 2, 1998, pending.

U.S. patent application Ser. No. 09/114,228, filed Jun. 30, 1998, pending.

U.S. patent application Ser. No. 09/114,231, filed Jun. 30, 1998, pending.

U.S. patent application Ser. No. 09/107,719, filed Jun. 30, 1998, pending.

U.S. patent application Ser. No. 09/053,415, filed Apr. 1, 1998, pending.

U.S. patent application Ser. No. 09/053,104, filed Apr. 1, 1998, pending.

Hornick et al., "A Shared, Segmented Memory System for an Object–Oriented Database," Brown University, ACM. vol. 5, No. 1, Jan. 1987, pp. 70–95.

Chawathe et al., "Change Detection in Hierarchically Structured Information," Stanford University, SIGMOD 1996, pp. 493–504.

Schroeder et al., "Performance of Firefly RPC," ACM. 1990, pp. 1–17.

Rolia et al., "Modeling RPC Performance," May 16–20, 1994 Proceedings of ACM Sigmetrics Conference on Measurement and Modeling of Computer Systems, pp. 282–283.

Covaci et al., "Mobile Intelligent Agents for the Management of the Information Infrastructure," Proceedings of the Thirty–First Hawaii International Conference on System Sciences, 1998 IEEE, vol. 7, pp. 24–33.

Schuster et al. "Client/Server Qualities: A Basis for Reliable Distributed Workflow Management Systems," Proceedings of the $17^{th}$ International Conference on Distributed Computering Systems, May 27–30, 1997, pp. 186–193.

* cited by examiner

METHOD AND SYSTEM FOR DISTRIBUTED TRANSACTION PROCESSING WITH ASYNCHRONOUS MESSAGE DELIVERY

FIELD OF THE INVENTION

This invention relates generally to transaction processing, and more particularly to distributed transaction processing in a network with asynchronous communications in the form of messages.

BACKGROUND OF THE INVENTION

In distributed databases, a transaction may involve operations to be performed at different sites. The operations in a transaction must be performed atomically (i.e., either all of them are performed or none of them is performed.) Atomic transaction implementation is typically based on a commit protocol, such as the widely used two-phase commit protocol. In a "prepare" phase of the two-phase commit protocol, a transaction coordinator asks all resource managers involved in the transaction to vote whether each of them can guarantee the execution of its part of the transaction. If all votes are positive, the transaction coordinator in a "commit" phase asks each resource manager to actually carry out its respective operation.

The implementation of the conventional two-phase commit for distributed transaction processing in a network with asynchronous communications poses significant problems. With asynchronous communications, one application sends a request to a receiving application regardless of whether the receiving application is operating. The request is passed through the network which includes nodes that can come on or off at random intervals. There is no guarantee when the request will reach the receiving application and when the requesting application will receive a response from the receiving application. In the conventional commit process, after sending a positive vote in the prepare phase, a resource manager may have to lock up its resource so that it will be able to fulfill its promise of performing the requested operation when it receives a commit instruction from the transaction coordinator. When applied to distributed databases, the two-phase commit protocol locks up the data in a database involved in the transaction so that no changes requested by other clients can be made. Due to the unpredictable delivery time of asynchronous communications, the database may be locked up for an unacceptably long time and become useless.

SUMMARY OF THE INVENTION

In accordance with the present invention, there is provided a method and system for processing distributed transactions that integrates the execution of operations of a transaction on separate computers with the exactly-once in-order message delivery of a message queuing system to allow the transaction operations to be performed atomically and asynchronously. In a distributed transaction, a first application on a first computer requests a local resource manager to perform a first operation and uses a message queue (MQ) server to send a request message to a second application on a remote computer for the performance of a second operation. The local resource manager and the MQ server of the first computer are coordinated to perform the first operation and send the request message in a local committed transaction. The message is delivered exactly once and in sequence to a target message queue for the second application on the remote computer. The second application uses the MQ server of the remote computer to read the message and uses a second resource manager to perform the requested second operation in a second local committed transaction. As part of the second local committed transaction, the MQ server of the remote computer sends an acknowledgment which is delivered by the message queuing system to the MQ server of the first computer.

In accordance with another aspect of the invention, a connector computer is used to bridge two different message queuing systems to allow the processing of a distributed transaction which involves computers in the two message queuing systems. The connector computer is connected to both message queuing systems and has a connector application. When an application in the first message queuing system initiates a transaction and sends a request message to an application on a second computer in the second message queuing system, the message is routed to a message queue of the connector computer. The connector application translates the message into the format of the second message queuing system and forwards the translated message to the second computer.

The advantages of the invention will become apparent with reference to the following detailed description when taken in conjunction with the drawings in which:

Figure 1:
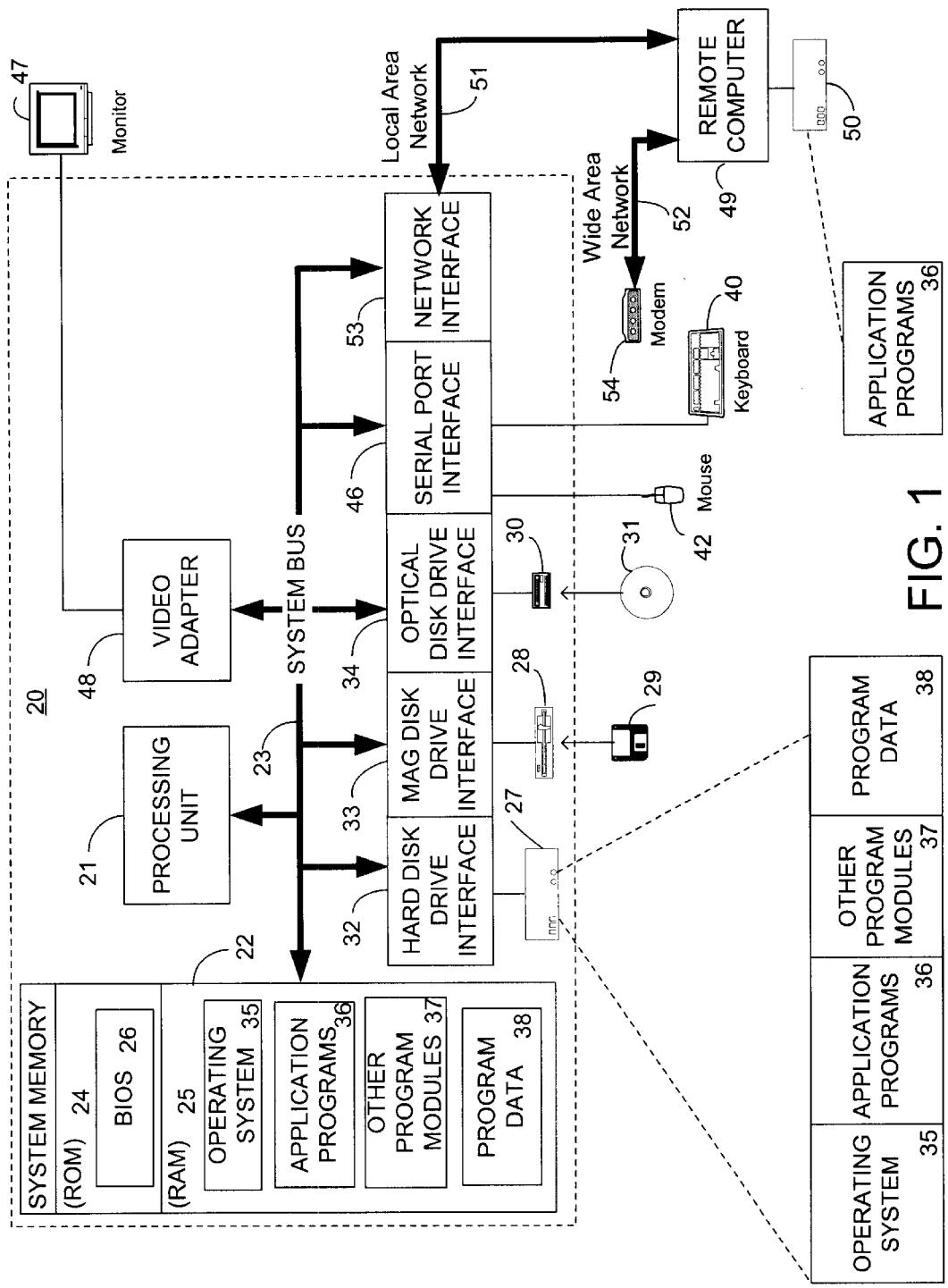
FIG. 1 is a block diagram of a computer system that may be used to implement a method and apparatus for implementing distributed transaction processing in a message queuing system according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is directed to distributed transaction processing in a network with a message queuing system which enables applications to send messages to, and receive messages from, other applications. A message may contain data in any format that is understood by both the sending and receiving applications. When the receiving application receives a request message, it processes the request according to the content of the message and, if required, sends an acknowledgment message back to the original sending application. The sending and receiving applications may be on the same machine or on separate machines connected by a network. While in transit between the sending and receiving applications, the message queuing system keeps messages in holding areas called message queues. The message queues protect messages from being lost in transit and provide a place for an application to look for messages sent to it when it is ready.

With asynchronous communications in the form of messages, the sending application can send multiple request messages to different receivers at one time and can turn immediately to other tasks without having to wait for any of the receiving applications to respond to the request messages. The messages can be sent regardless of whether the receiving applications are running or reachable over the network.

Figure 2:
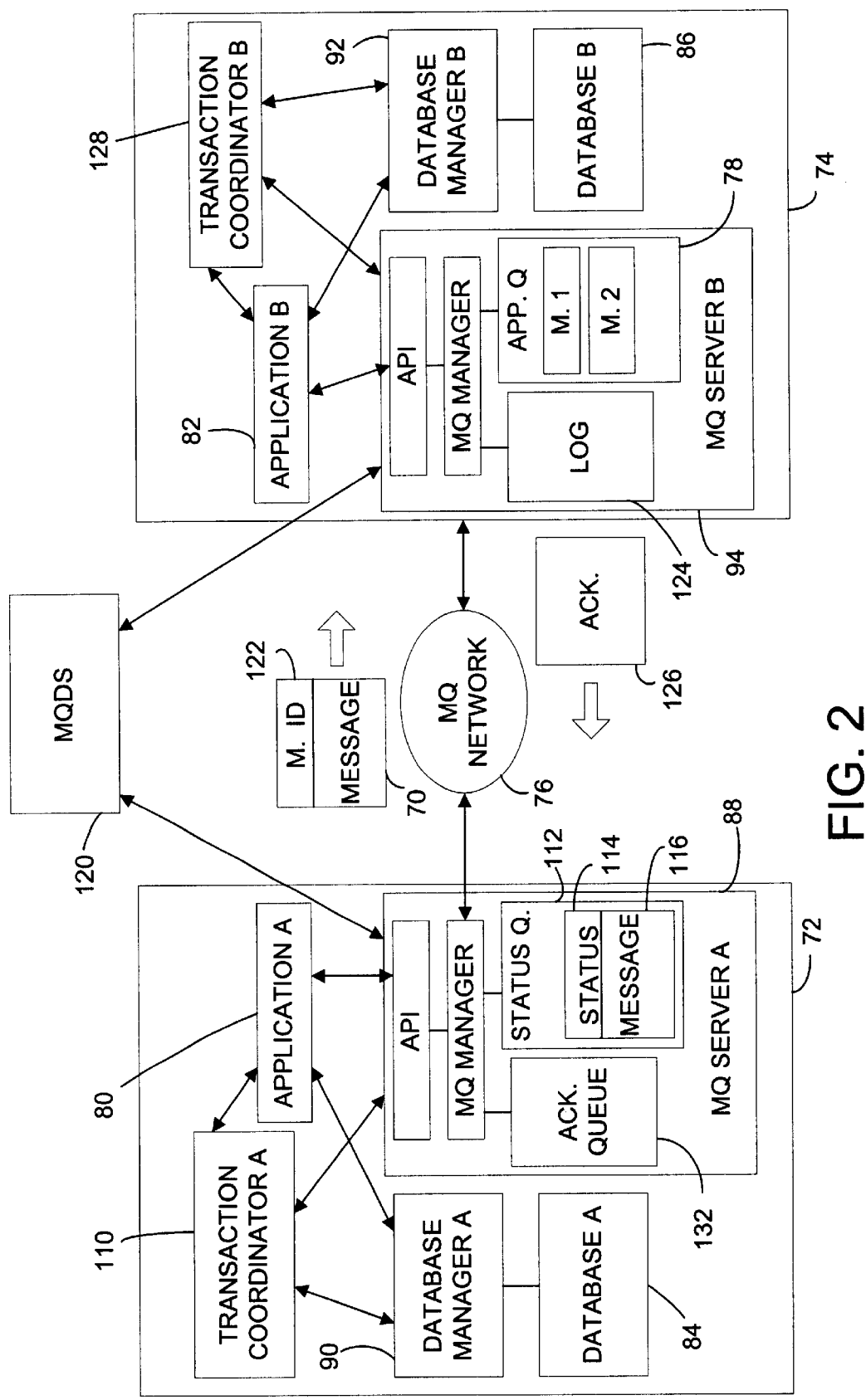
FIG. 2 is a schematic diagram showing two computers in a message queuing system that are involved in a distributed transaction.

In accordance with a feature of the invention, the atomicity of a distributed transaction implemented with asynchronous message delivery is achieved by integrating the execution of different parts of the transaction on separate computers with the exactly-once in-order message delivery of the message queuing system. FIG. 2 illustrates the atomic processing of a distributed transaction which involves two operations to be carried out on two respective computers 72 and 74. The two computers are connected by a network 76 of a message queuing system which supports asynchronous message delivery. The transaction is initiated by an application 80 on the first computer 72 and involves a first operation to be carried out by a first resource manager on the first computer and a second operation to be performed by a second resource manager on the second computer 74. The two operations are to be performed atomically, i.e., either both of them are executed or neither of them is executed.

The first application 80 sends its request for the execution of the second operation as a request message 70 to a second application 82 on the second computer.

In accordance with the invention, the first operation of the distributed transaction and the sending of the request message are performed together in a local committed transaction on the first computer 72. The request message 70 is delivered by the message queuing system exactly once and in order to a message queue 78 for the second application 82. The second application 82 reads the message and requests the second resource manager to carry out the second operation in a local committed transaction on the second computer. As part of the second local committed transaction, the message queue (MQ) server 92 of the second computer sends an acknowledgment message to the MQ server 88 of the first computer. The acknowledgment is delivered by the message queuing system exactly once to the first computer 72, thereby closing the loop of the coordinated transaction processing.

By way of example, the distributed transaction may be a transfer of money from an account in one bank to another account in a second bank. The banking application 80 running on the computer 72 of the first bank updates a local database 84 which contains the account of the first bank according to the money transfer. The application 80 also sends a request message 70 to the application 82 on the computer 74 of the second bank to update a local database 86 which contains the account of the second bank to reflect the money transfer. The request message 70 is delivered by the message queuing system to a message queue 78 for the application 82 on the computer of the second bank. The asynchronous nature of the message delivery allows the first application 80 to respond to other service requests without having to wait to hear from the computer 74 of the second bank regarding the request. The computer application 82 of the second bank retrieves and reads the message from the message queue 78 and updates the local database 86 as requested. For the money transfer transaction to be properly executed, the updates of the databases 84 and 86 have to go together. If one of them fails, the other should not take place or, if already executed, should be reverted.

In accordance with the invention, the local operation requested by the first application 80, namely the updating of the database 84, is combined with the sending of the request message 70 by the MQ server 88 of the computer 72 as one local committed transaction. By integrating the database update operation with the sending of the request message, it is ensured that the request message 70 is sent out only when the database 84 is updated. As will be described in greater detail below, the message queuing system delivers the message 70 to the message queue 78 for the second application 82 exactly once and in order with respect to other messages sent by the first computer 72 to the same message queue 78. In this way, the application 80 initiating the transaction is ensured that when its part of the transaction is performed the remote application 82 will ultimately receive the request message and act accordingly in a coordinated manner.

Figure 3:
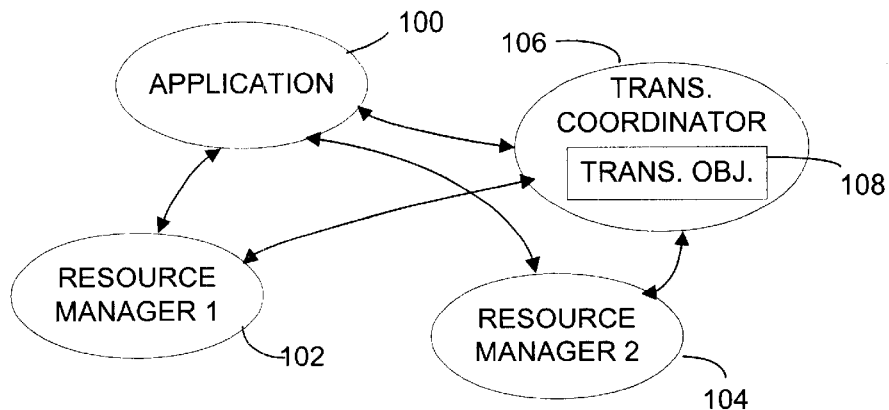
FIG. 3 is a schematic diagram showing participants of a two-phase commit protocol.

In a preferred embodiment, the local committed transactions on the request sending and receiving computers are executed using a known two-phase commit protocol. FIG. 3 illustrates the operation of the two-phase protocol. The participants in the commit process includes an application 100 which initiates the committed transaction, two (or more) resource managers 102 and 104 each responsible for carrying out an operation on a stateful resource as part of the transaction, and a transaction coordinator (TC) 106 for coordinating the commit process. To initiate a transaction, the application 100 requests the TC 106 to start the new transaction. In response, the TC 106 creates a new transaction object 108 for keeping track of the transaction and returns to the application 100 a transaction ID. The application 100 then requests the resource managers 102 and 104 involved in the transaction to perform their respective operations and passes the transaction ID to each of them. Each resource manager checks and remembers the request directed to it, but does not actually make any change to its resource.

If all resource managers involved in the transaction have verified the correctness of their respective requests, the application 100 requests the TC 106 to "commit" the transaction. In the first phase (the "prepare" phase) of the protocol, the TC 106 calls each resource manager involved in the transition to "vote" if it can guarantee that it will later execute its requested operation. If a resource manager makes a positive vote, it logs the operation and force-writes the log into a non-volatile memory so that it can recover from a crash.

If all resource managers vote positively in the prepare phase, the TC 106 moves to the second stage (the "commit" phase) of the commit protocol by asking each resource manager to actually carry out its requested operation. The resource manager cannot now refuse to execute its part of the transaction; it must do what it has promised in the prepare stage. In this way, the TC 106 ensures that the complete transaction will be carried out. In other words, the operations of the resource managers 102 and 104 will be performed atomically. On the other hand, if any resource manager in the prepare phase votes negatively, the TC 106 aborts the transaction and asks each resource manager to roll back as if nothing had been requested.

Figure 4:
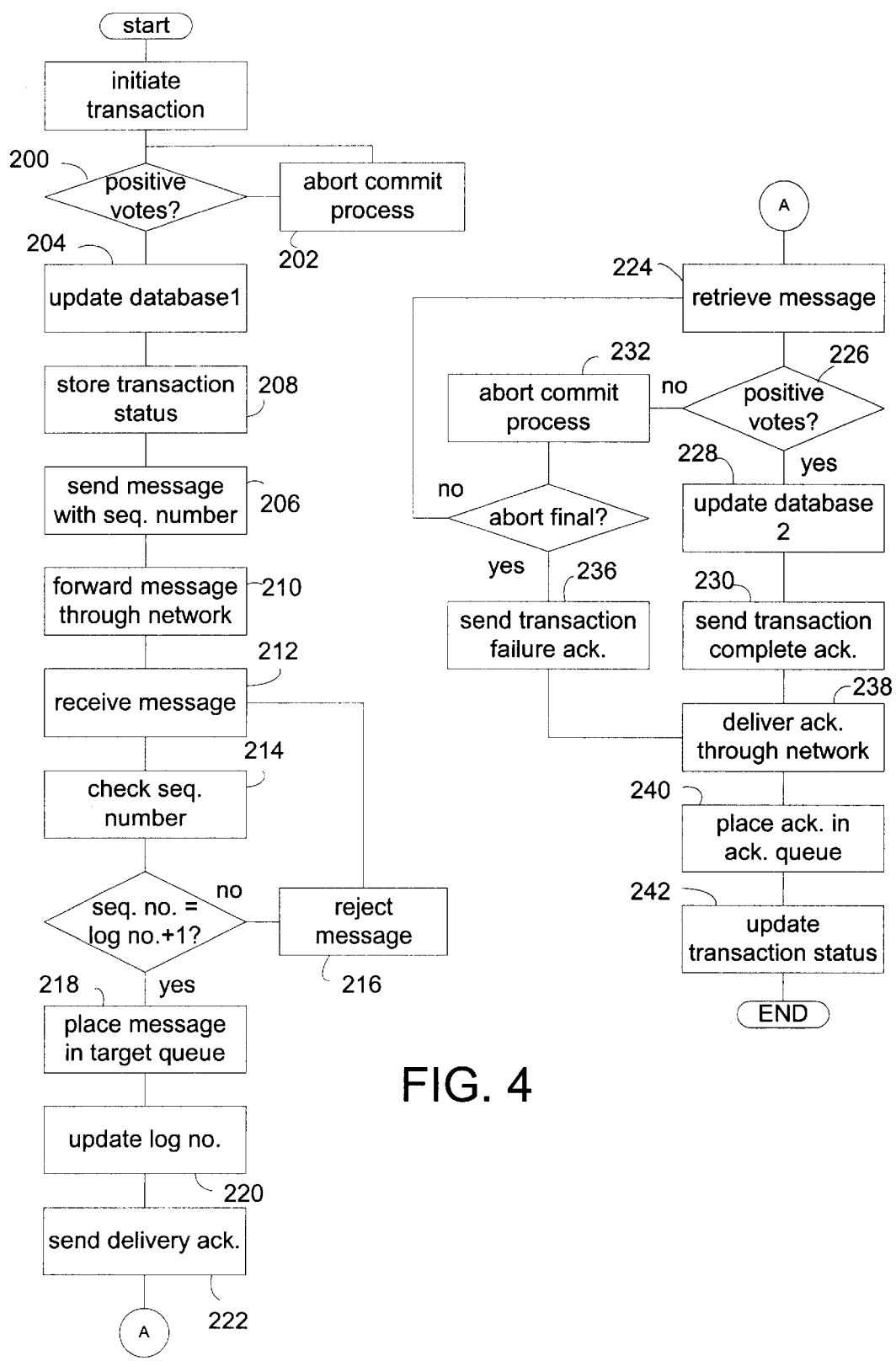
FIG. 4 is a flow chart showing steps in an exemplary distributed transaction coordinated according to the invention.

Referring now to FIGS. 2 and 4, in the illustrated embodiment, the resource managers involved in the local committed transaction on the first computer includes the database manager 90 and the MQ server 88. Likewise, the resource managers in the second local committed transaction on the second computer includes the database manager 92 and the MQ server 94 on the second computer. In the example of the money transfer transaction, the application 80 initiated a local committed transaction by sending a transaction request to the transaction manager 110 and obtains a transaction ID therefrom. The application 80 then requests the database manager 90 to update the local database 84, and requests the MQ server 88 to send the request message 70 to the remote application 82 as parts of the local committed transaction. The local TC 110 coordinates the execution of the local transaction, which includes updating the database 84 and sending the message 70, by engaging the database manager 90 and the MQ server 88 in the two-phase commit described above. In the prepare phase, the TC 110 calls the database manager 90 and the MQ server 88 to vote whether they can guarantee to perform their respective operations (step 200). If either the database manager 90 or the MQ server 88 is unavailable or gives a negative vote, the local transaction is aborted (step 202), and the TC 110 may try the transaction again later. Ultimately the database manager 90 updates the database (step 204) and the MQ server 88 sends the request message (step 206) in the commit phase of the protocol. The MQ server 88 also stores a copy of the message in a local status queue 112 as part of the transaction (step 208). A status field 114 associated with the stored message 116 indicates the processing status of the message. It will be appreciated that the up front allocation of storage space by the message queuing system for the transaction message and its execution status ensures that the resources will be available to guarantee that any notification regarding the outcome of the transaction will be properly handled.

A message sent by one application on one computer to another application on a different computer may have to traverse a network 76 with different intermediate nodes (step 210). To prevent the possibility of losing the message in transit, the message is preferably passed from one node to the next in the message route using a store-and-forward approach. Under this approach, the first node stores a copy of the message in its memory before sending the message to the next node in a direct session, and deletes its copy of the message only after having successfully passed the message to the next node.

To coordinate the atomic processing of the distributed transaction, the message queuing system has to guarantee that each message sent from one computer to a destination message queue residing on another computer is "delivered" to the destination queue once and only once and that it is delivered in proper order with respect to other messages to the same message queue. As used herein, "deliver" means that the message not only reaches the receiving computer 74 but also is actually placed in the target message queue 78 for retrieval by the application 82. The exactly-once delivery is necessary to avoid processing the same part of the distributed transaction more than once by the receiving application 82. The in-order delivery is required for many types of transactions. For instance, in the case of maintaining a bank account, it is critical to process withdrawals and deposits in their proper orders.

When a message is sent by the MQ server 88, the message queuing system routes the message through the network 76 to the target queue 78 based on routing information in a message queue directory service (MQDS) 120. Which route the message will take depends on many factors, including whether the computers in a given route are on are off. For example, one message may travel along a route because a node on a shorter route is off. A second message sent later by the computer 72 to the same destination queue 78 may take the shorter route if the node on the shorter route is back in operation and may reach the destination computer before the first message.

It is also possible for the destination computer 74 to receive more than one copy of the same message. The computers on the network may go up and down at random intervals. To deal with the possibility that a message may be trapped in a route due to the unexpected downtime of a node, the MQ server of the source computer 72 may choose to resend the message after a pre-set delivery timeout period has expired without receiving a delivery acknowledgment from the destination computer 74. Both the first and second copies of the message may ultimately arrive at the receiving computer 74.

In a preferred embodiment, the exactly-once in-order delivery is achieved by the use of a message identification (ID) 122 assigned to each message. The messages sent by the MQ server 88 of the sending computer to the destination queue 78 are sequentially numbered. The message ID 122 comprises a source ID which uniquely identifies the source computer, a destination ID which uniquely identifies the destination queue, and the sequence number of the message. The message ID is sent as part of the message by the computer 72 to the receiving computer 74 (step 206).

The receiving computer 74 keeps a log file 124 which stores the sequence number of the last message delivered (i.e., the last message from the source computer that is placed in the destination queue). When the receiving computer 74 receives a message via the network (step 212), the message queue (MQ) server 94 checks the sequence number of the message (step 214). If the sequence number of the newly received message is greater than the stored sequence number of the last delivered message by more than one, the new message has been delivered out of order. In a preferred embodiment, the MQ server 94 simply throws the new message out (step 216) under the assumption that another copy of the same message will arrive later, and waits for the message with the right sequence number (i.e., the stored sequence number plus one) to arrive. Alternatively, the MQ server 92 may store the newly received message in a buffer queue while waiting for the in-order message to arrive. On the other hand, if the sequence number of the newly arrived message is equal or smaller than the stored sequence number, the receiving computer has already received a copy of the same message, and the new message is thrown out (step 216).

If the sequence number of the new message is in sequence with the stored sequence number, the MQ server 92 places the new message in the target queue 78 (step 218), updates the log 124 (step 220), and returns a delivery acknowledgment (step 222) to the MQ server 88 of the source computer informing it that the message has been delivered so that it should not continue to resend the message. Upon receipt of this delivery acknowledgment, the MQ server 88 of the first computer 72 changes the status 114 of the message to "Delivered."

After the request message is placed in the message queue 78, the receiving application 82 starts a new local committed transaction. In this local transaction, the receiving application uses the MQ manager 94 to retrieve the message from the message queue 78 (step 224) as part of the local transaction. The receiving application 82 further uses the database manager 92 to update the database 86 as part of the local transaction. The local transaction coordinator (TC) 128 coordinates the operations of the MQ manager 94 and the database manager 92 in a two-phase commit protocol.

If the TC 128 receives a positive vote from the database manager 92 in the prepare phase of the commit protocol (step 226), it asks the database manager to commit to the update operation (step 228). When the TC 128 calls the MQ server 94 in the commit phase, the MQ manager sends a final acknowledgment 126 to the MQ server 88 of the first computer indicating the successful execution of the distributed transaction (step 230).

If the database manager 92 gives a negative vote in the prepare phase, the TC 128 aborts the local transaction (step 232). The action taken by the MQ server 94 in the case of abort may depend on whether the abort is temporary or permanent. The database manager 92 may be required to provide the reason for giving a negative vote. If the negative vote is given because of some temporary conditions, the TC 128 may indicate in its abort request that the abort is temporary. In that case, the MQ server 94 puts the message back in the message queue 78 so that it can be retrieved again later. No acknowledgment is sent by the MQ server 94. On the other hand, the negative vote may be due to conditions that are unlikely to be changed. For example, the database manager may give a negative vote if the requested operation violets database constraints. In such a case, the TC 128 informs the MQ server 94 that the abort is final (i.e., it will not retry the commit process). Upon receipt of a permanent abort request, the MQ server 94 sends a negative acknowledgment to the MQ manager 88 of the first computer (step 236).

It will be appreciated that in the arrangement of this embodiment the receiving application 82 does not have to be concerned with sending an acknowledgment for the request message. By including the MQ server 94 and the database manager 92 in the local committed transaction, the sending of the acknowledgment is handled automatically by the MQ server when the database 86 is updated.

The acknowledgment message, which may indicate either transaction completion or permanent abort, is delivered to the MQ server 88 (step 238) with the exactly-once guarantee described above and is put in an acknowledgment queue 132 (step 240). The MQ server 88 reads the acknowledgment and modifies the status field 114 of the message in the status queue 112 according to the acknowledgment (step 242). The copy of the message in the status queue is deleted by the MQ server upon receipt of the transaction completion acknowledgment.

If no acknowledgment is received from the computer 74 within a pre-set transaction timeout period, the MQ manager 88 sets the status of the request as "In Doubt." In this case, it is the responsibility of the application 80 to clean up the status queue, because it has to analyze the failure of the transaction. The "In Doubt" status of a transactional message may be used to prompt the administrator of the first computer 72 to investigate potential problems by means independent of the message queuing system. For example, in the example of the money transfer, the database administrator of the first bank may make a telephone call to the administrator of the second bank to identify the cause of the lack of response.

The application 80 which initiated the distributed transaction may check the status field 114 of the request message in the status queue 112. If the application 80 learns that the remote application 82 has failed to perform its part of the transaction (as indicated by a negative status in the status queue), it may execute a local compensation operation to cancel (or undo) the changes made to the local database 84 in the first local committed transaction.

For simplicity and clarity of illustration, the invention has been described so far using an example of a transaction which involves only two applications on two separate computers. It will be appreciated, however, that the transaction coordination of the invention is applicable to transactions involving more computers. In such a case, the initiating application sends request messages to each of the remote applications involved in the transaction. The sending of the messages and the execution of the sending computer's part of the distributed transaction are carried out as a committed local transaction. Each of the request messages is delivered exactly once and in order to a message queue for a corresponding remote application. The remote application reads the message and performs its requested operation, and the message queue manager of the remote computer sends an acknowledgment in a local committed transaction. The status queue of the transaction-initiating computer keeps track of the receipt of acknowledgments from all of the remote computers involved. The distributed transaction is successfully completed only when a positive acknowledgment is received from each of the remote computers.

Figure 5:
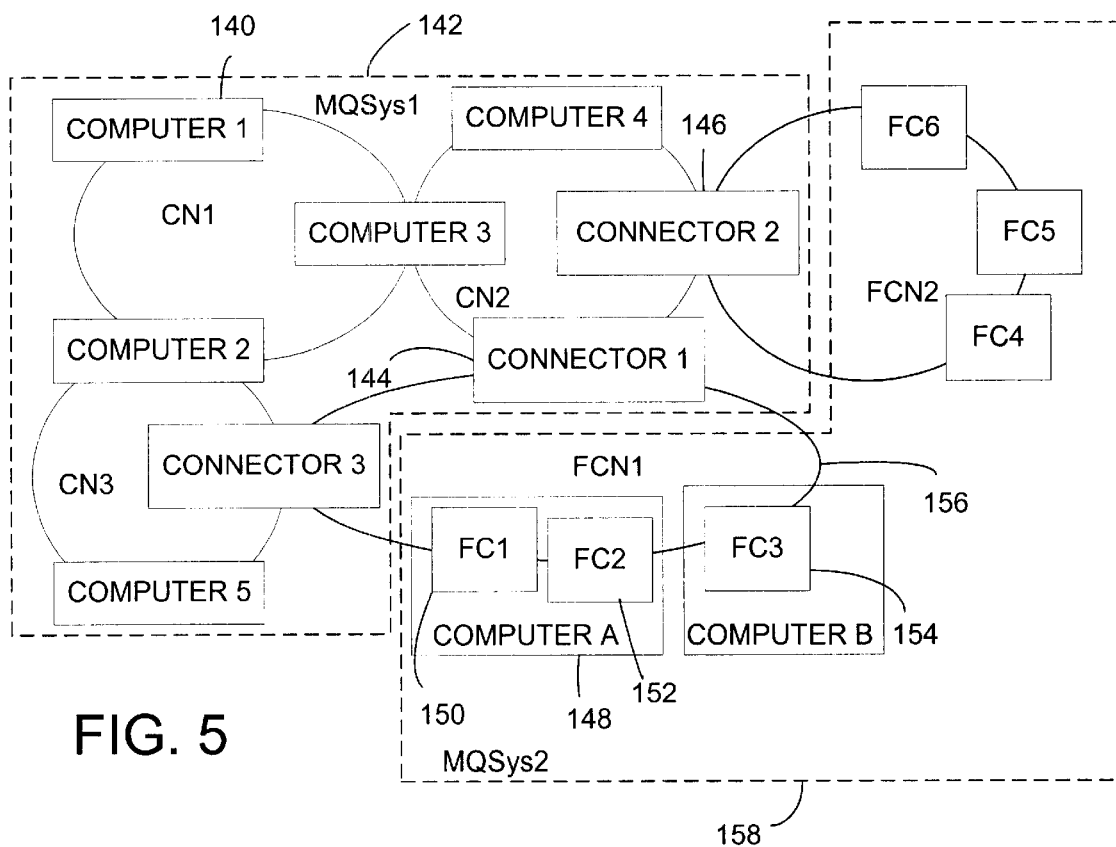
FIG. 5 is a schematic diagram showing two message queuing systems bridged by connector computers.

In accordance with another aspect of the invention, a distributed transaction may involve applications on computers in two or more different message queuing systems. For example, as shown in FIG. 5, an application on the computer 140 in a first message queuing system (MQSys1) 142 may initiate a distributed transaction which involves a computer 150 in a second message queuing system (MQSys2) 158.

The application on the computer 140 performs a local operation as part of the distributed transaction and sends a request message to the computer 150 for the performance of a second operation.

In accordance with the invention, one or more "connector" computers are provided to bridge two different message queuing systems to allow applications in one message queuing system (e.g., MQSys1) to interact with applications in a "foreign" message queuing system (e.g., MQSys2). In the embodiment of FIG. 5, to allow the applications in MQSys1 to send messages to message queues in MQSys2, several types of "foreign" messaging objects are defined in the message queue directory service (MQDS) 120 (FIG. 5) of MQSys1. A Foreign Queue (FQ) is a message queue defined on a machine that is not part of the MQSys1. A Foreign Computer (FC) is a machine that is not a node of MQSys1 and serves as a container for Foreign Queues. A Foreign Computer is not a physical machine. For instance, the computer 148 in FIG. 5 has two MQSys2 queue managers thereon, and two Foreign Computers 150 and 152 corresponding to the two queue managers are defined in the MQDS. A Foreign Connected Network (FCN) includes a group of Foreign Computers and at least one Connector computer that form a connected network, i.e., they can directly access each other. Each connector computer is on at least one connected network of MQSys1 and at least one Foreign Connected Network of MQSys2. In the embodiment of FIG. 5, the Foreign Computers 150, 152, 154 and the Connector computers 144 form a Foreign Connected Network 156.

Figure 6:
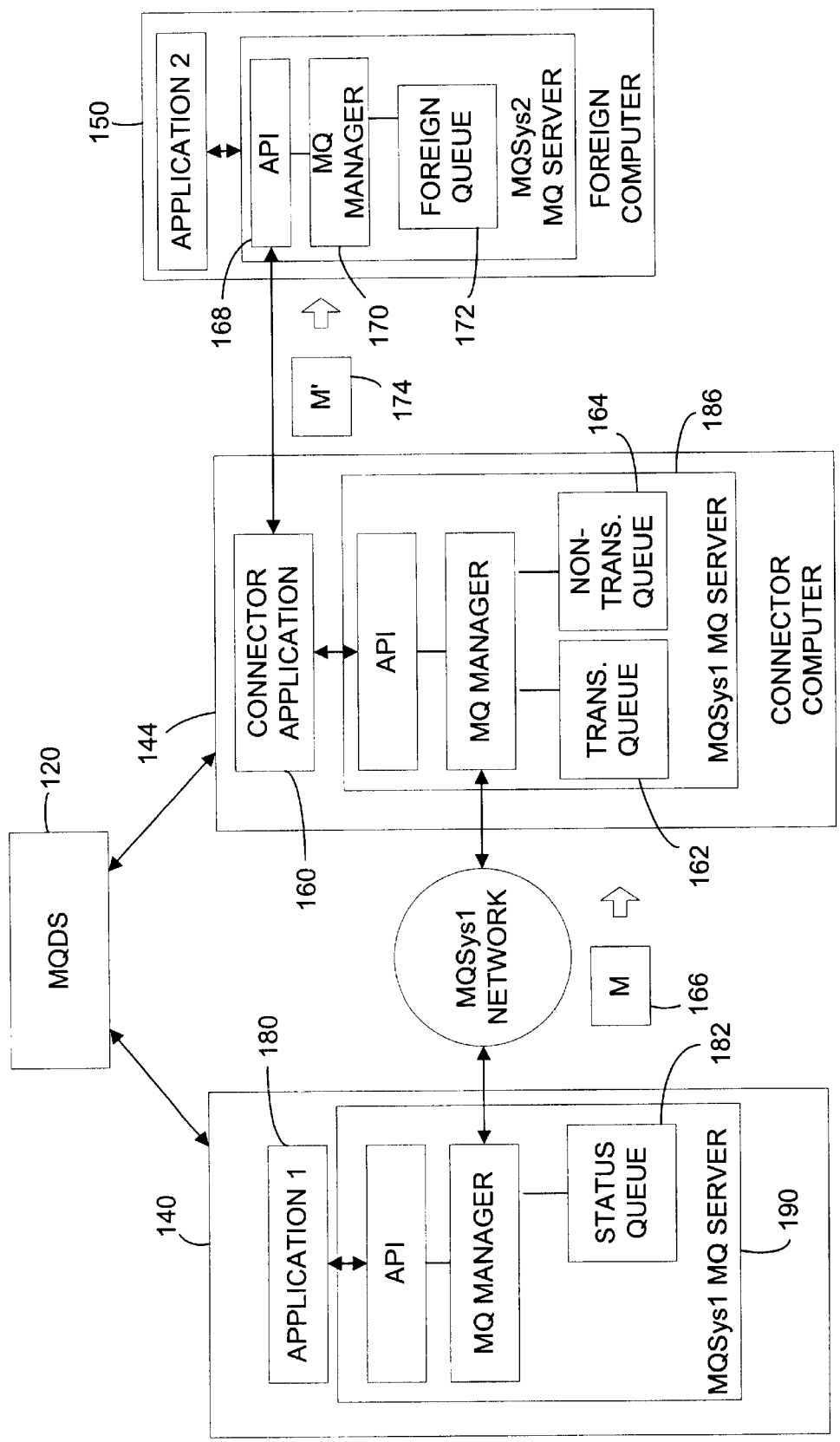
FIG. 6 is a schematic diagram showing two computers in two different message queuing systems that pass messages in a distributed transaction via a connector computer.

Turning now to FIG. 6, the connector 144 includes a connector application 160 and connector message queues 162 and 164 to handle the passing of messages between MQSys1 and MQSys2. The connector application 160 is able to translate between the different message formats of MQSys1 and MQSys2. When a message arrives from one system, the connector application reads the message properties according to the format of the sending system and translates their values into the format of the receiving system. The connector application 160 then uses the MQSys2 application programming interface (API) 168 to access the MQSys2 MQ manager 170 on the Foreign Computer 150 to forward the translated message 174 (with its new properties) to the destination Foreign Queue 172.

The connector queues are internal queues that are not registered in the MQDS 120 as possible destination queues. In a preferred embodiment, a pair of connector queues, including a transactional queue 162 for storing transactional messages and a non-transactional queue 164 for non-transactional messages, are provided for each Foreign Connected Network connected to the Connector computer 144. For the message sending application 180, sending a message to a Foreign Queue 172 is no different from sending a message to a queue in MQSys1. The routing of the message to the connector 144 is handled by the message queuing system and is transparent to the sending application. Because the connector queues are internal queues rather than regular destination queues, placing messages in these queues and reading the messages from them by means of the MQ server 186 do not generate acknowledgment messages. It is the responsibility of the connector application 160 to send the pertinent acknowledgment messages to the MQ server 190 of the sending computer 140.

When an application 180 in MQSys1 sends a request message to a Foreign Queue 172 on a Foreign Computer 150 in the course of a distributed transaction, MQSys1 routes the message 166 to the connector computer 144 for the Foreign Connected Network on which the Foreign Computer resides. The message routing is performed according the definitions in the MQDS 120. When the message 166 is sent, the MQ manager 190 of the source machine keeps a copy of the message with a status field in its status queue 182. When the MQ server 186 of the connector 144 receives the message, it places the message in the transactional connector queue 162. The connector application 160 reads the message in the transactional connector queue, translates it, then forwards the translated message to the destination Foreign Queue 172. Likewise, when a message from the Foreign Computer 150 is routed to the Connector 144, the connection application translates it and then forwards it to the target queue in MQSys1.

In accordance with the invention, the atomic transaction processing described above in connection with FIGS. 2 and 3 is applicable to a transaction involving computers in two (or more) different message queuing systems bridged by a connector computer. To ensure the integrity of the communications for coordinating the transaction processing, both message queuing systems support exactly-once in-order message delivery, and the connector application preserves the semantics of messages being passed through it. Similar to the distributed transaction in a single messaging system, the application initiates a transaction by requesting a local operation and sending a request message to be delivered to the Foreign Queue 172. The local operation and the sending of the message are performed in a local committed transaction. The request message is routed through the Connector computer 144 to the target Foreign Queue 172 on the Foreign Computer 150 exactly once and in order. The operation requested in the message and the sending of an acknowledgment are carried out as a local committed transaction on the Foreign Computer 150. The acknowledgment is then delivered through the Connector computer 144 to the initiating computer 140.

In view of the above detailed description, it can be appreciated that the invention provides a method and system for coordinating the processing of a distributed transaction in the environment of a message queuing system for asynchronous communications. The operations involved in the distributed transaction are combined with the sending of a request message and the sending of an acknowledgment in local committed transactions. The integration of the performance of the operations of the transaction and the delivery of the messages ensures reliable communications between the applications involved in the transaction for achieving the atomic execution of the distributed transaction. The message-based coordination of distributed transaction processing can also be implemented in heterogeneous messaging environments by the use of connector computers to bridge different message queuing systems.

What is claimed is:

1. A method of coordinating execution of a distributed transaction on first and second computers connected by a network with asynchronous message delivery, comprising the steps of:

requesting, by a first application on the first computer, a first resource manager to perform a first operation as part of the distributed transaction;

generating, by the first application, a request message to a second application on the second computer for performing a second operation;

coordinating the first resource manager to carry out the first operation and a first message queue server to send the request message to the second application in a first local committed transaction;

setting a message status for the request message;

delivering the request message to a target queue maintained by a second message queue server of the second computer exactly once and in order;

receiving, by the second application, the request message from the target queue;

coordinating a second resource manager to carry out the second operation and the second message queue server to send a transaction acknowledgment to the first queue server in a second local committed transaction;

delivering the transaction acknowledgment to the first message queue server;

modifying the message status according to the transaction acknowledgment.

2. A computer-readable medium having computer-executable instructions for performing steps recited in claim 1.

3. A method as in claim 1, wherein the step of delivering the request message exactly once and in order includes:

sending the request message with a sequence number;

checking, by the second message queue server upon receipt of the request message, the sequence number of the request message;

rejecting the request message when the sequence number of the request message is not in order with a logged number identifying a last delivered message from the first computer;

placing the request message in the target queue when the sequence number of the request message is in order with the logged number;

updating the logged number;

sending a delivery acknowledgment to the first computer.

4. A computer-readable medium having computer-executable instructions for performing steps recited in claim 3.

5. A method as in claim 3, wherein the step of delivering the request message exactly once and in order further includes resending the request message by the first computer upon expiration of a timeout period without receiving a delivery acknowledgment from the second message queue server.

6. A method as in claim 1, further including the step of checking the message status by the first application.

7. A method as in claim 6, further including the step of undoing the first operation when the transaction acknowledgment is negative.

8. A method as in claim 1, wherein the first and second resource managers are database managers and the first and second operations are database update operations.

9. A method as in claim 1, further including the step of updating the message status to indicate a failure to receive a transaction acknowledgment from the second computer within a pre-set transaction timeout period.

10. A method as in claim 1, wherein the steps of coordinating use a two-phase commit protocol.

11. A system for coordinating a distributed transaction which involves a first application on a first computer for executing a first operation and a second application on a second computer for executing a second operation, comprising:

a first message queue server on the first computer for sending a request message generated by the first application to the second application for performing the second operation;

a first transaction coordinator on the first computer for coordinating the execution of the first operation and the sending of the request message in a first local committed transaction;

a message queue on the second computer for storing the request message for reading by the second application;

a second message queue server for managing the message queue on the second computer, the second message queue manager cooperating with the first message queue manager for exactly-once in-order delivery of the request message to the message queue; and a second transaction coordinator on the second computer for coordinating a second local committed transaction which includes performing the second operation and sending an acknowledgment by the second message queue server to the first application.

12. A system as in claim 11, wherein the first and second local committed transactions use a two-phase commit protocol.

13. A system as in claim 11, wherein the first message queue server sends the request message with a message sequence number.

14. A system as in claim 11, further including a message status queue for storing a processing status of the request message.

15. A system as in claim 11, further including a first resource manager of the first computer for performing the first operation and a second resource manager of the second computer for performing the second operation.

16. A system as in claim 15, wherein the first and second resource managers are database managers.

* * * * *

UNITED STATES PATENT AND TRADEMARK OFFICE
CERTIFICATE OF CORRECTION

PATENT NO.    : 6,529,932 B1
DATED         : March 4, 2003
INVENTOR(S)   : Dadiomov et al.

It is certified that error appears in the above-identified patent and that said Letters Patent is hereby corrected as shown below:

<u>Title page,</u>
Item [56], OTHER PUBLICATIONS, "Newton," reference, "8hu th Ed," should read -- $8^{th}$ Ed --.

Signed and Sealed this

First Day of July, 2003

JAMES E. ROGAN
*Director of the United States Patent and Trademark Office*